A. H. BICKEL.
SAD IRON.
APPLICATION FILED JULY 21, 1910.
1,024,306.
Patented Apr. 23, 1912.
2 SHEETS—SHEET 1.
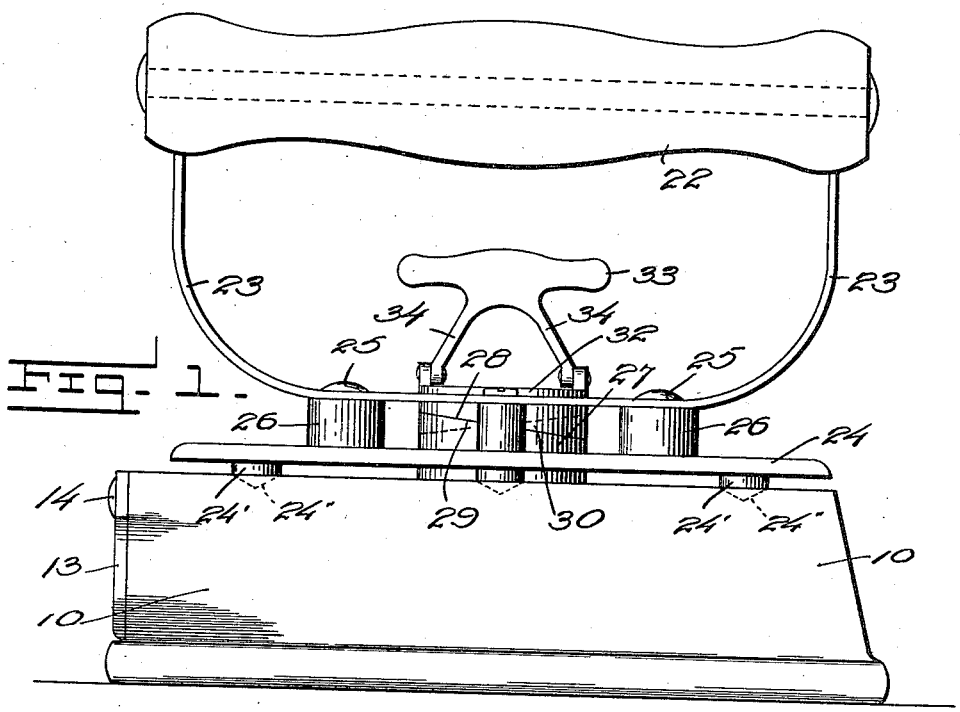
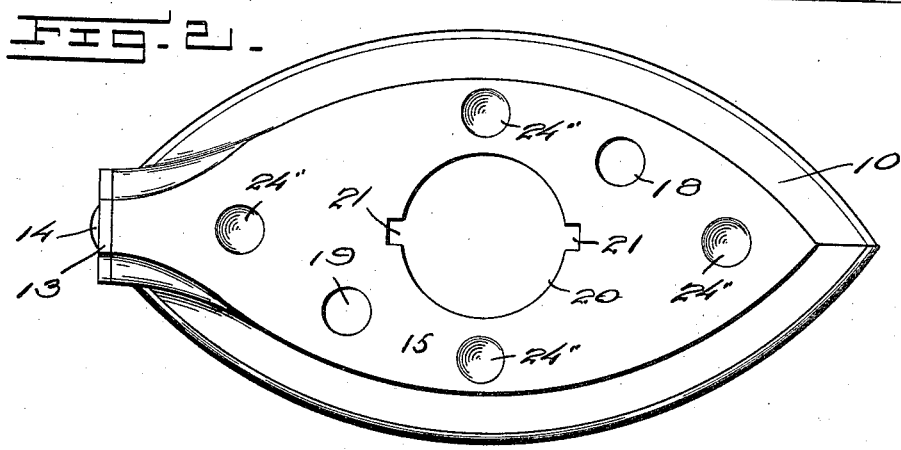
Witnesses
Inventor
A. H. Bickel,
By Woodward & Chandlee.
Attorneys

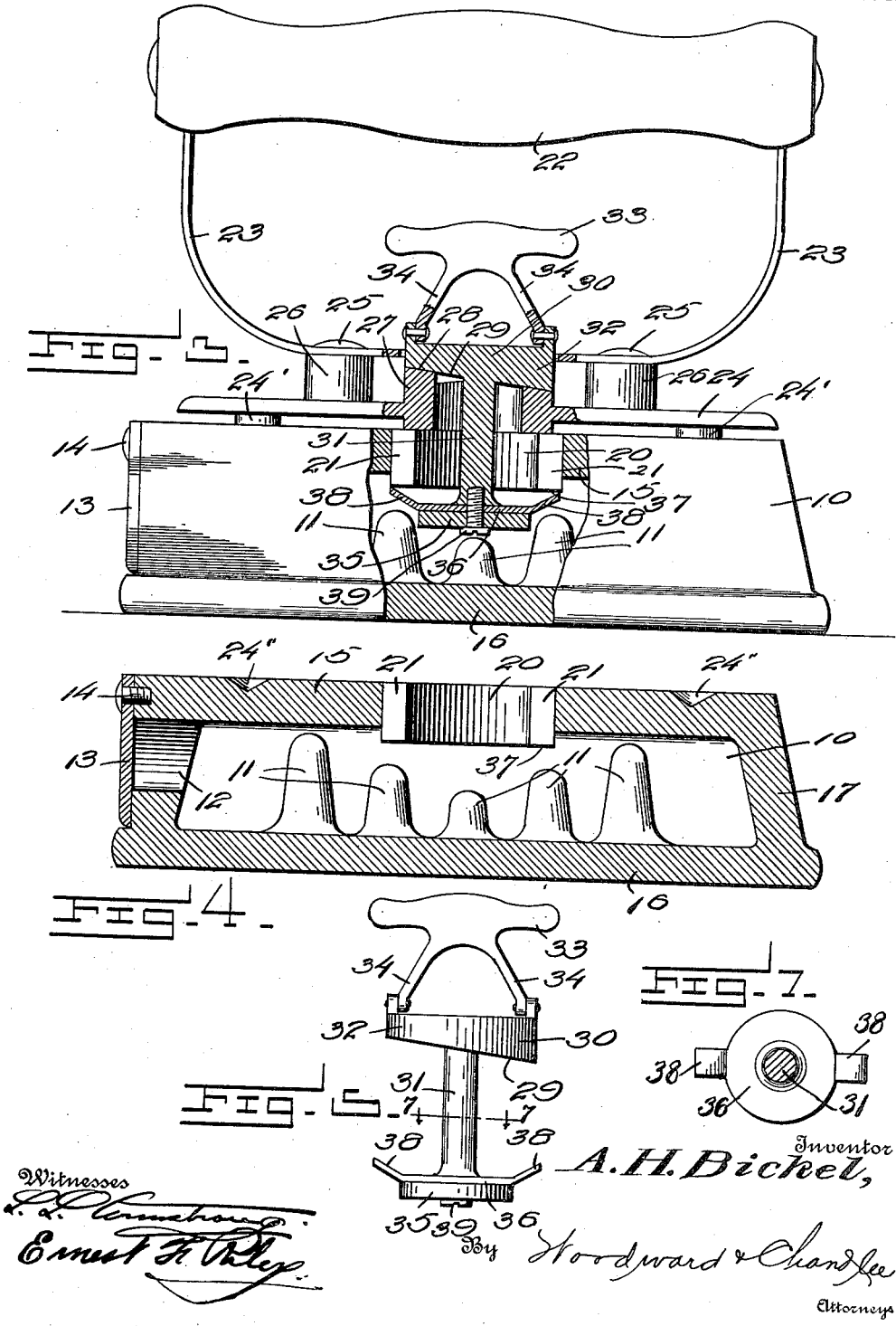
A. H. BICKEL.
SAD IRON.
APPLICATION FILED JULY 21, 1910.
1,024,306.
Patented Apr. 23, 1912.
2 SHEETS—SHEET 2.

UNITED STATES PATENT OFFICE.

AUGUST H. BICKEL, OF BRIDGEPORT, CONNECTICUT.

SAD-IRON.

1,024,306.

Specification of Letters Patent.

Patented Apr. 23, 1912.

Application filed July 21, 1910. Serial No. 573,085.

*To all whom it may concern:*

Be it known that I, AUGUST H. BICKEL, a citizen of the United States, residing at Bridgeport, in the county of Fairfield and State of Connecticut, have invented certain new and useful Improvements in Sad-Irons, of which the following is a specification.

This invention relates to an improvement in said irons, the primary object being to construct a device of this character in such a manner as to permit the ready removal and attachment of the handle.

A further object is to so construct the iron, that the same may be conveniently heated.

With these and other objects in view, the present invention consists in the combination and arrangement of parts which will be hereinafter more fully described and particularly pointed out in the appended claims, it being understood that the changes in the specific structure shown and described, may be made within the scope of the claims without departing from the spirit of the invention.

In the drawings: Figure 1 is a side elevation of the iron with the handle attached, Fig. 2 a top plan view, the iron handle being removed, Fig. 3 is a view partly in section showing the manner of locking the handle to the iron, Fig. 4 is a longitudinal sectional view of the iron, Fig. 5 is a view showing the locking devices in detail, Fig. 6 a detail view showing swinging door of the iron, Fig. 7 represents a cross sectional view on the line 7—7 of Fig. 5.

In the drawings: 10 designates the iron base which is hollow, the interior base portion being provided with a plurality of projections 11 adapted to retain the heat. Arranged at one end of the base is an opening 12 which is normally closed by the pivotally arranged plate 13, said plate being secured to the iron by a screw 14. The iron is provided with an upper oval plate 15, and a lower oval plate 16, which are formed integral with the side walls 17 which properly space the plates. The upper plate is provided with openings 18 and 19, to permit the escape of the heat and gases. Arranged between these openings, is a circular opening 20 which is provided with longitudinally arranged slots 21. The handle consists of the holding portion 22 which is supported by the U-shaped member 23. A plate 24 is secured to the U-shaped member 23 by rivets 25, said plate and said member being spaced by sleeves 26. Secured to said plate 24 is an annular member 27, said member being adapted to bear upon the plate 15 around the opening 20. This annular member 27 is provided with a cam surface 28, which is adapted to engage with the cam surface 29 arranged on the member 30. The member 30 consists of a staff 31 and a rounded portion 32, the under-face of which is provided with the cam surface 29, before mentioned. A bail 33 is pivotally connected to the portion 32 by arms 34 which permits said bail to drop to either one side or the other. Arranged on the end portion of the staff 31 is a plate 35 which is adapted to hold the plate 36 in contact with an annular shoulder 37 formed on the plate 15. The plate 36 is provided with squared extensions 38 which are slightly resilient. The member 35 is secured to the staff 31 by a bolt 39, the cam surface 29 resting on the annular member 27 and the staff portion 31 extending downwardly through said member, the squared extensions being arranged longitudinally of the handle.

In attaching the handle to the iron the members 38 are placed in the recesses 21 and the handle forced downwardly. The bail is then rotated until the extensions are brought to bear with sufficient force against the shoulder 37 through the action of the cam surfaces on the members 27 and 30 which, when the member is rotated, will draw the staff 31 upward, thereby causing the extensions 38 to bear against the shoulder 37 arranged at the base portion of the opening 20, thus securely locking the handle to the iron. It will be seen that when the handle and iron are locked together, the bail 33 may be swung upon its pivots, thus permitting the hand of the operator to grasp the iron handle. The plate 24 is provided with projections 24' which are adapted to enter the depressions 24'' formed in the iron, thereby positively preventing the handle from rotating on the iron. It will be seen from the foregoing that an attaching device of this character may be readily positioned and removed, the entire manipulation being such as may be accomplished by one hand of the operator.

What is claimed is:

1. The combination with a hollow sad iron having a top plate, said plate having a circular aperture formed therein with a pair of radiating slots extending from diametrically opposite points on the periphery of the aperture, of a plate resting on the top of the sad iron and having a handle secured thereto, said plate having an aperture formed therein to lie above the aperture of the top plate and having an annulus surrounding said aperture and formed with an upper cam face, and a standard depending through the alined apertures and having a cam head bearing against the cam face of the annulus and having resilient arms secured to its lower end to be passed through the slots of the sad iron plate and clampingly forced against the under face of said plate by rotation of the standard.

2. The combination with a hollow sad iron having a top plate formed with a central aperture and having recesses formed in its upper face, of a plate having depending lugs formed to fit in the recesses of the sad iron plate and having an aperture formed therein and disposed in alinement with the aperture of the sad iron plate when the lugs are fitting within said recesses, said latter plate having a handle secured thereto, an annulus projecting upward from the plate around the aperture and having a cam edge, the sad iron top plate having slots radiating from the aperture therein, and a standard extending downward through the apertures in the two plates and having a head resting on the cam face of the annulus and having arms adapted to be passed downward through the slots in the sad iron top plate and to engage the under face of said plate when the standard is rotated, the rotation of the standard causing the head to ride on the cam face of the annulus to force the arms into clamping engagement with the under face of the plate.

3. A locking device for sad iron handles, comprising a plate having a handle secured thereto, said plate having a central aperture surrounded by an annulus having a cam upper edge, a standard passing downward through the aperture in the plate and having a cam head adapted to ride on the cam edge of the annulus, said standard having resilient arms for engaging a sad iron upon rotation of the standard relative to the plate and annulus, and a handle pivoted to the cam head of the standard for rotating the standard.

In testimony whereof I affix my signature, in the presence of two witnesses.

AUGUST H. BICKEL.

Witnesses:
R. S. GEDULDIZ,
A. A. KLINE.

---

Copies of this patent may be obtained for five cents each, by addressing the "Commissioner of Patents, Washington, D. C."